No. 739,998. PATENTED SEPT. 29, 1903.
E. R. EDSON.
APPARATUS FOR SEPARATING GREASE.
APPLICATION FILED MAY 20, 1903.
NO MODEL.

WITNESSES:
Daniel E. Daly
G. M. Hayes.

INVENTOR
Eugene R. Edson
BY
his ATTORNEYS

No. 739,998. Patented September 29, 1903.

UNITED STATES PATENT OFFICE.

EUGENE RILEY EDSON, OF CLEVELAND, OHIO.

APPARATUS FOR SEPARATING GREASE.

SPECIFICATION forming part of Letters Patent No. 739,998, dated September 29, 1903.

Application filed May 20, 1903. Serial No. 157,924. (No model.)

*To all whom it may concern:*

Be it known that I, EUGENE RILEY EDSON, a citizen of the United States of America, residing at Cleveland, in the county of Cuyahoga and State of Ohio, have invented certain new and useful Improvements in Apparatus for Separating Grease from Grease-Yielding Material; and I hereby declare the following to be a full, clear, and exact description of the invention, such as will enable others skilled in the art to which it pertains to make and use the same.

This invention relates to apparatus suitable for use in separating grease or greasy and oily matter from raw fish and other raw material capable of yielding the same.

The general object of this invention is to economically separate grease from grease-yieldable and gelatin-yieldable material by the treatment of the said material with water at a temperature low enough to effect a congelation of the grease and to facilitate and positively effect a separation of the grease from the mass.

With this general object in view and to the end of realizing other advantages hereinafter appearing the said invention consists in certain features of construction and combinations of parts hereinafter described, and pointed out in the claims.

Figure 1:
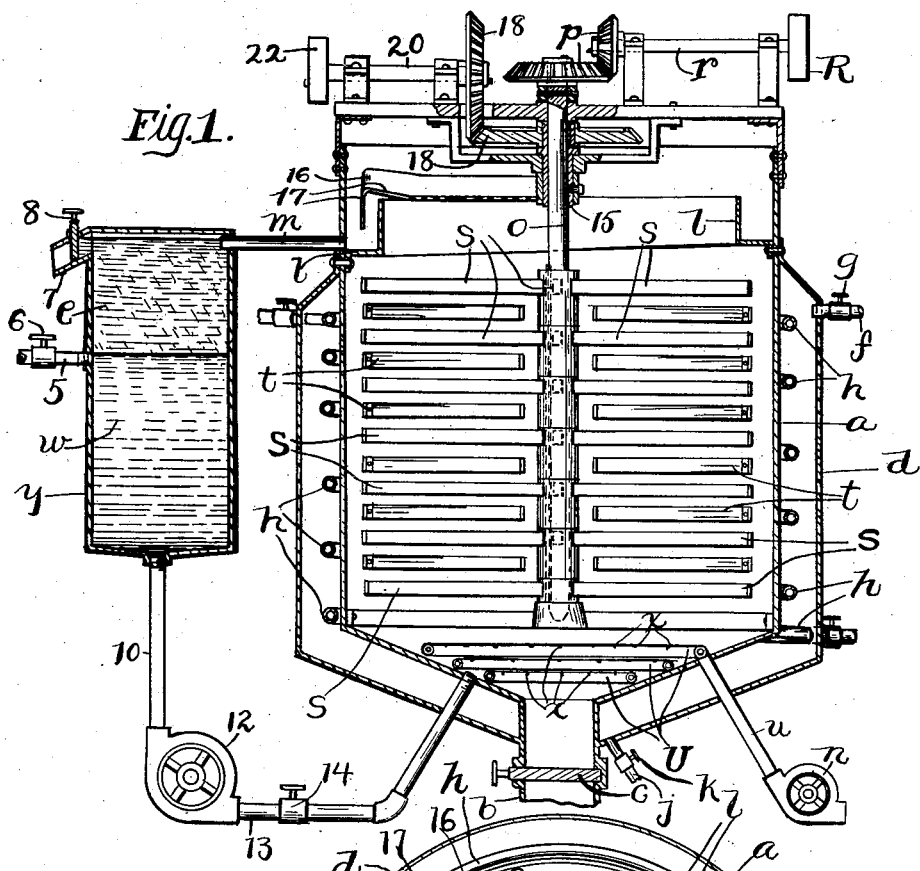
Figure 2:
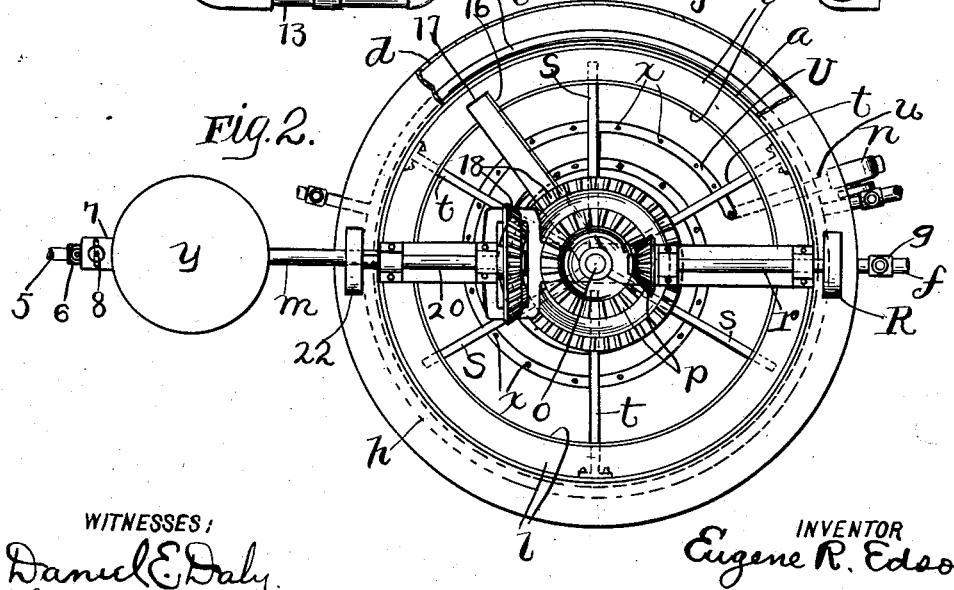

In the accompanying drawings, Figure 1 is a side elevation, largely in section, of apparatus embodying the invention which constitutes the subject of this application. Fig. 2 is a top plan, partly in section, of the apparatus.

Referring to the drawings, $a$ designates a tank or receptacle which is open at its upper end for accommodating the introduction into the receptacle of the grease-yieldable material which is to be treated.

The receptacle $a$ is provided at its lower end and centrally with a downwardly-extending tube or duct $b$, which communicates at its upper end with the interior chamber of the said receptacle and forms the outlet of the receptacle and has a normally closed valve $c$.

The chamber of a cooling-jacket $d$, which surrounds the receptacle $a$, is adapted to receive cold brine, and a pipe $f$ is arranged to conduct brine into the said chamber and has a normally closed valve $g$.

A series of refrigerating-coils $h$ of a refrigerating plant is arranged within the jacket $d$ around the receptacle $a$. The jacket $d$ is provided at its lower end with a drain-pipe $j$, which has a normally closed valve $k$.

The receptacle $a$ is provided at its upper end with an annular trough $l$, and $m$ designates a pipe which has its receiving end communicating with the chamber of the said trough.

A stirring-shaft $o$ is arranged vertically and centrally of the chamber of the receptacle $a$ and extends from within the lower end of the said chamber upwardly and a suitable distance above the said receptacle. The shaft $o$ is supported in any approved manner and is intergeared at its upper end, as at $p$, with a suitably-supported shaft $r$, which is operatively provided with a driving-wheel R, to which power is applied in any approved manner. The shaft $o$ is provided within the chamber of the receptacle $a$ and at suitable intervals vertically with laterally-projecting radially-arranged stirring-arms $s$, and the receptacle $a$ is provided interiorly and at suitable intervals vertically with stationary arms $t$, which alternate with the arms $s$—that is, the arms $s$ and $t$ have such relative arrangement that the arms $s$ shall, during the rotation of the shaft $o$, revolve between and in close proximity to the arms $t$, and consequently the said arms $s$ and $t$ coöperate in stirring and disintegrating the material undergoing treatment within the receptacle $a$.

An air-conducting pipe $u$ communicates at its receiving end with the outlet of a suitably-operated pump $n$. The pipe $u$ extends through the chamber of the cooling-jacket $d$ into the lower portion of the chamber of the receptacle $a$, wherein it terminates in a coil U, arranged within the lower end of the said chamber and provided with orifices $x$, discharging upwardly into the said chamber. It will be observed, therefore, that means introducing cold air under pressure into the lower portion of the chamber of the receptacle $a$ is provided.

A tank $y$ is arranged at one side of and a short distance from the apparatus already described. The tank $y$ is supplied with cold water $w$, and the pipe $m$ communicates at its discharging end with the upper portion of the chamber of the said tank. The tank $y$ is arranged at an elevation below the trough $l$, so that any grease or matter overflowing into the said trough is readily conducted by the pipe $m$ into the said tank without requiring the employment of a pump in the line of the said pipe.

A water-conducting pipe 5 discharges into the tank $y$ and has a normally closed valve 6.

A grease-conducting chute 7 is in open relation with the upper end of the chamber of the tank $y$ and has a normally closed valve 8. In Fig. 1 a body of grease or grease-containing liquid $e$ is shown floating on the body of water $w$.

The tank $y$ is provided at its lower end with a water-discharge pipe 10, which connects with the inlet of a suitably-operated pump 12, whose outlet communicates with a pipe 13, which discharges into the lower end of the chamber of the receptacle $a$ and has a normally closed valve 14.

The operation of the apparatus and the meritorious steps resulting therefrom are as follows: The chamber of the cooling-jacket is supplied with brine, and a circulation of the cooling or refrigerating agent through the series of coils $h$ is established, so as to result in cooling the receptacle $a$ and any material supplied to the said receptacle. The material to be treated is introduced into the chamber of the receptacle $a$ with enough water to float on top of the mass any grease or greasy and oily matter separated from the said material during its treatment within the said receptacle. The mass introduced into the receptacle $a$ is preferably about half water and half grease-yielding material and has been sliced or cut into small pieces. Preferably the receptacle $a$ is filled with grease-yielding material and water to near the top of the trough $l$. The temperature of the said mass is preferably maintained at about 40° Fahrenheit during the treatment of the material—that is, the material is treated with water within the receptacle $a$ at a temperature high enough to prevent freezing of the mass and low enough to congeal the grease or oily and greasy matter contained in the material, and the liberated congealed grease readily rises through the cold water of the mass to the top of the mass, where it is skimmed off or conducted into the trough $l$ and passes from the said trough through the pipe $m$ into the tank $y$, wherein it floats upon the body of water within the said tank, whence it can be conducted through the chute 7 upon opening the valve 8 when the level of the floating grease within the said tank rises opposite to the receiving end of the said pipe. The grease-yieldable material introduced into the receptacle $a$ for treatment is cut into small pieces, as already indicated, preparatory to the introduction of the material into the said receptacle, so that the grease shall be readily liberated at the aforesaid comparatively low temperature, and the shaft $o$ is operated during the treatment of the material, and the revolving shaft-arms $s$ coöperate with the stationary arms $t$ in stirring and further breaking or disintegrating the material, so as to facilitate the passage of the grease from the material and permit the same to rise to the top of the mass. Not unimportant in stirring and facilitating the liberation and rising of the grease is the introduction of cold air into different portions of the lower end of the chamber of the receptacle $a$ during the operation of the pump $n$, which is operated during the treatment of the material.

Of course the grease or greasy and oily matter will congeal or tend to congeal at a temperature of 40° Fahrenheit; but the congealed matter will readily break away or separate from the material undergoing treatment and will rise to the top of the mass, and the stirring of the mass and the introduction of air under pressure into the mass will positively liberate the congealed greasy or oily matter from the material and permit it to rise to the top of the mass, where the said greasy and oily matter, being lighter than the water, floats on top of the mass and thence passes into the trough $l$. Of considerable value is the pumping of water from the tank $y$ into the receptacle $a$, so as to cause the level of the mass within the said receptacle to rise and result in the overflowing of water and grease from the top of the mass into the trough $l$, whence the said grease and accompanying water passes through the pipe $m$ into the tank $y$, and the pump 12 is operated continuously during the treatment of the material, so as to establish a circulation of water through the mass, which circulation participates in stirring the mass and is instrumental in the liberation of grease and in facilitating the passage of the grease to the top of the mass, and enough water is continually pumped into the receptacle $a$ during the operation of the apparatus to effect an overflow of water from the said receptacle into the trough $l$, and obviously the overflow of water into the said trough will carry with it greasy and oily matter which has risen to the top of the mass. The passage of the grease which has risen to the top of the mass may be facilitated by skimming the said grease into the said trough. The residue remaining within the receptacle $a$ when all of the grease has been separated from the material can be conducted off through the tube or duct $b$ upon opening the valve $c$.

Suitable means for skimming the risen congealed grease from the top of the mass into the trough $l$ comprises a suitably-supported tubular shaft 15, which is provided within the upper end of the chamber of the receptacle $a$ with a laterally-projecting skimming-arm 16, which extends over and into the trough $l$ and has a flange 17, which extends from end to end of the arm along the lower edge of the arm and projects in the direction in which the said arm revolves during the operation of the said shaft. Fig. 2 shows the arm 16 shifted somewhat relative to the position it occupies in Fig. 1 to avoid confusion of lines in Fig. 2. The shaft 15 is intergeared, as at 18, with a suitably-supported shaft 20, which is operatively provided with a driving-wheel 22, to which power is applied in any approved manner.

The shaft o is rotated in the direction in which the flange 17 of the skimming-arm 16 projects.

What I claim is—

1. Apparatus for separating grease from grease-yielding material, comprising a receptacle provided, at its lower end, with a valved tube or duct which communicates with the interior chamber of the said receptacle; a cooling-jacket surrounding the receptacle; an annular trough arranged to receive matter overflowing from the aforesaid chamber; a stirring-shaft arranged vertically and centrally of the said chamber and provided with stirring-arms; means for rotating the shaft; a coil arranged within the lower end of the aforesaid chamber and provided with upwardly-discharging orifices; means for supplying air under pressure to the said coil; a tank arranged externally of the aforesaid chamber at an elevation below the aforesaid trough; a pipe establishing communication between the said trough and the said tank; a valved water-conducting pipe discharging into the tank; a valved grease-conducting passage-way communicating with the tank at the upper end of the tank; a water-discharge pipe communicating with the tank at the lower end of the tank, and a pump having its inlet communicating with the outlet of the pump and discharging into the aforesaid chamber.

2. Apparatus for separating grease from grease-yielding material, comprising a receptacle provided, at its lower end, with a valved tube or duct which communicates with the interior chamber of the receptacle; means for cooling the receptacle; an annular trough arranged to receive matter overflowing from the aforesaid chamber; a stirring-shaft arranged within the said chamber and provided with stirring-arms; means for rotating the shaft; means for supplying air under pressure to the lower end of the aforesaid chamber; a water-containing tank arranged externally of the said chamber and having a grease-outlet at its upper end; means for establishing communication between the trough and the said tank; a valved water-conducting pipe discharging into the tank; a water-discharge pipe communicating with the water-containing portion of the tank; a pump having its inlet communicating with the said water-discharge pipe, and a pipe communicating with the outlet of the pump and discharging into the aforesaid chamber.

3. Apparatus for separating grease from grease-yielding material, comprising a receptacle; means for cooling the receptacle; a trough arranged to receive matter overflowing from the interior chamber of the receptacle; means for mechanically stirring material treated within the said chamber; a water-containing tank arranged externally of the said chamber and having a grease-outlet at its upper end; means for establishing communication between the trough and the said tank; a valved water-conducting pipe discharging into the tank; a water-discharge pipe communicating with the water-containing portion of the tank; a pump having its inlet communicating with the said water-discharge pipe, and a pipe communicating with the outlet of the pump and discharging into the aforesaid chamber.

4. Apparatus for separating grease from grease-yielding material, comprising a receptacle; an annular trough arranged to receive matter overflowing from the interior chamber of the receptacle; a stirring-shaft arranged vertically and centrally of the said chamber and provided with stirring-arms; means for rotating the said shaft; a tubular shaft embracing the upper portion of the stirring-shaft and provided with a skimming-arm arranged to skim grease from the top of a mass of material treated in the aforesaid chamber into the trough; means for rotating the said tubular shaft, means for supplying water to the aforesaid chamber, and means for conducting the grease from the trough.

5. Apparatus for separating grease from grease-yielding material, comprising a receptacle; means for cooling the receptacle; a coil arranged within the lower end of the aforesaid chamber and provided with upwardly-discharging orifices; means for supplying the air under pressure to the said coil and comprising a pipe communicating with the said coil and extending through the chamber of the cooling-jacket and a pump whose outlet communicates with the said pipe; a water-containing tank arranged externally of the aforesaid chamber and having a grease-outlet, and means for conducting matter overflowing from the said chamber into the tank.

6. Apparatus for separating grease from grease-yielding material, comprising a receptacle; means for cooling the receptacle; means for stirring material treated within the interior chamber of the said receptacle; a tank arranged externally of the said chamber and having a grease-outlet; means for conducting matter overflowing from the said chamber into the tank; a valved water-conducting pipe discharging into the tank; a water-discharge pipe communicating with the tank at the lower end of the tank; a pump having its inlet communicating with the said water-discharge pipe, and a pipe communicating with the outlet of the said pump and discharging into the aforesaid chamber.

7. Apparatus for separating grease from grease-yielding material, comprising a receptacle; a cooling-jacket surrounding the receptacle; means for stirring material treated within the receptacle to effect a liberation of congealed grease or greasy and oily matter from the said material and to permit the liberated grease to rise to the top of the mass, and means for separating the risen congealed matter from the mass.

8. Apparatus for separating grease from grease-yielding material, comprising a receptacle; means for cooling the receptacle; means for stirring the material treated within the receptacle; means for supplying water to the lower portion of the interior chamber of the receptacle to overflow grease from the receptacle, and means for collecting the grease overflowing from the receptacle.

9. Apparatus for separating grease from grease-yielding material, comprising a receptacle; means for cooling the receptacle; means for stirring the material treated in the receptacle; means for supplying water to the lower portion of the interior chamber of the said receptacle; a water-containing tank arranged externally of the said receptacle, and means for conducting matter overflowing from the first-mentioned receptacle into the water-containing tank.

10. Apparatus for separating grease from grease-yielding material, comprising a receptacle; means for cooling the said receptacle to effect a congelation of the grease contained in the grease-yielding material treated within the receptacle; means for stirring or disintegrating the material during the treatment of the material within the said receptacle so as to liberate the congealed grease from the said material and permit and facilitate a rising of the said congealed grease to the top of the mass; a water-containing tank arranged externally of the aforesaid receptacle; means for pumping water from the said tank into the lower portion of the interior chamber of the first-mentioned receptacle, and means for conducting grease overflowing from the said chamber into the water-containing tank.

11. Apparatus for separating grease from grease-yielding material, comprising a receptacle; means for cooling the said receptacle; means for mechanically stirring the material treated within the said receptacle; means for introducing air under pressure into the lower portion of the mass of material treated within the said receptacle; means for pumping water into the lower portion of the said receptacle, and means for collecting congealed grease or greasy and oily matter overflowing from the upper end of the said receptacle.

In testimony whereof I sign the foregoing specification, in the presence of two witnesses, this 29th day of April, 1903, at Cleveland, Ohio.

EUGENE RILEY EDSON.

Witnesses:
C. H. DORER,
TELSA SCHWARTZ.